(12) United States Patent
Seo et al.

(10) Patent No.: US 8,817,738 B2
(45) Date of Patent: Aug. 26, 2014

(54) APPARATUS AND METHOD FOR TRANSCEIVING DOWNLINK CONTROL INFORMATION

(75) Inventors: Dong Youn Seo, Anyang-si (KR); Jung Hoon Lee, Anyang-si (KR); Ki Jun Kim, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 929 days.

(21) Appl. No.: 12/992,588

(22) PCT Filed: Aug. 12, 2009

(86) PCT No.: PCT/KR2009/004500
§ 371 (c)(1),
(2), (4) Date: Nov. 12, 2010

(87) PCT Pub. No.: WO2010/018993
PCT Pub. Date: Feb. 18, 2010

(65) Prior Publication Data
US 2011/0064164 A1     Mar. 17, 2011

Related U.S. Application Data

(60) Provisional application No. 61/088,334, filed on Aug. 12, 2008.

(30) Foreign Application Priority Data

Jul. 30, 2009 (KR) .................. 10-2009-0070060

(51) Int. Cl.
| | | |
|---|---|---|
| *H04W 4/00* | (2009.01) | |
| *H04L 1/18* | (2006.01) | |
| *H04L 1/16* | (2006.01) | |
| *H04W 72/04* | (2009.01) | |
| *H04J 11/00* | (2006.01) | |
| *H04L 1/00* | (2006.01) | |

(52) U.S. Cl.
CPC ............ *H04L 1/1607* (2013.01); *H04L 1/1861* (2013.01); *H04L 1/1812* (2013.01); *H04J 11/0069* (2013.01); *H04W 72/042* (2013.01); *H04L 1/0026* (2013.01)
USPC .......................................... 370/330; 370/332

(58) Field of Classification Search
CPC ................... H04W 72/04–72/12; H04W 4/20; H04W 16/14; H04W 72/1278–72/1294; H04W 74/002–74/008
USPC .................................. 370/310–350; 455/1–5
See application file for complete search history.

(56) References Cited

U.S. PATENT DOCUMENTS

| | | | |
|---|---|---|---|
| 2003/0043763 A1 | 3/2003 | Grayson | |
| 2009/0122736 A1* | 5/2009 | Damnjanovic et al. | ....... 370/311 |

(Continued)

FOREIGN PATENT DOCUMENTS

CN          101227261 A          7/2008

*Primary Examiner* — Andrew Chriss
*Assistant Examiner* — Kenan Cehic
(74) *Attorney, Agent, or Firm* — Mckenna Long & Aldridge LLP

(57) ABSTRACT

A method and apparatus for transceiving Physical hybrid-ARQ indicator channel in a wireless mobile communication system using multi-carriers is disclosed. This method comprises a first reception step of receiving signaling information indicating that a number (N1) of first downlink channels allocated to the first frequency band is 0 through the second frequency band, and a decision step of deciding the number (N1) of first downlink channels allocated to the first frequency band to be 0.

16 Claims, 17 Drawing Sheets

(56) References Cited

U.S. PATENT DOCUMENTS

| | | | |
|---|---|---|---|
| 2009/0285193 A1* | 11/2009 | Kim et al. | 370/342 |
| 2009/0290597 A1* | 11/2009 | Baumgartner et al. | 370/468 |
| 2010/0002675 A1* | 1/2010 | Fu et al. | 370/343 |
| 2013/0077587 A1* | 3/2013 | Kwak et al. | 370/329 |

* cited by examiner

FIG. 13
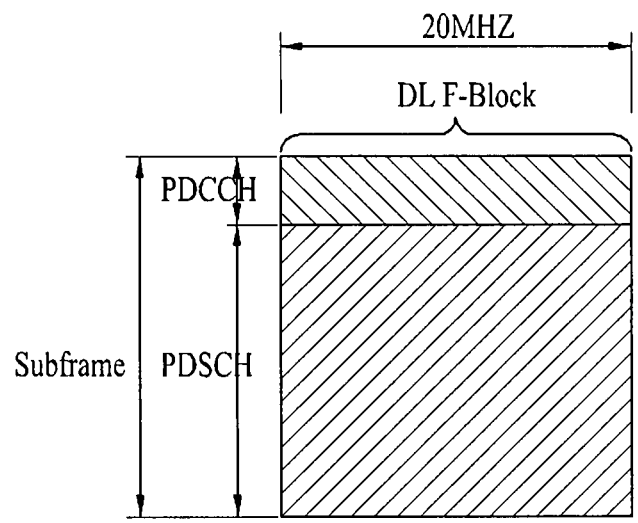
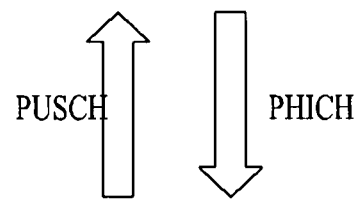
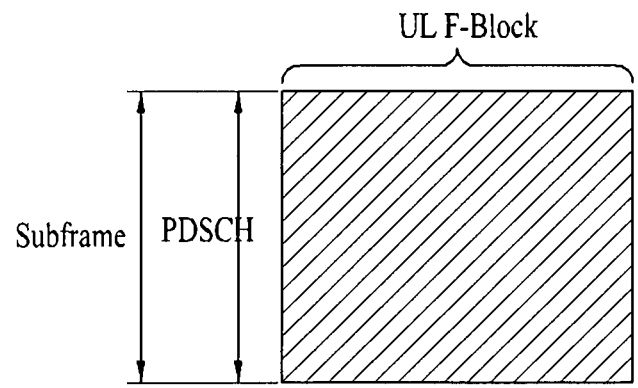

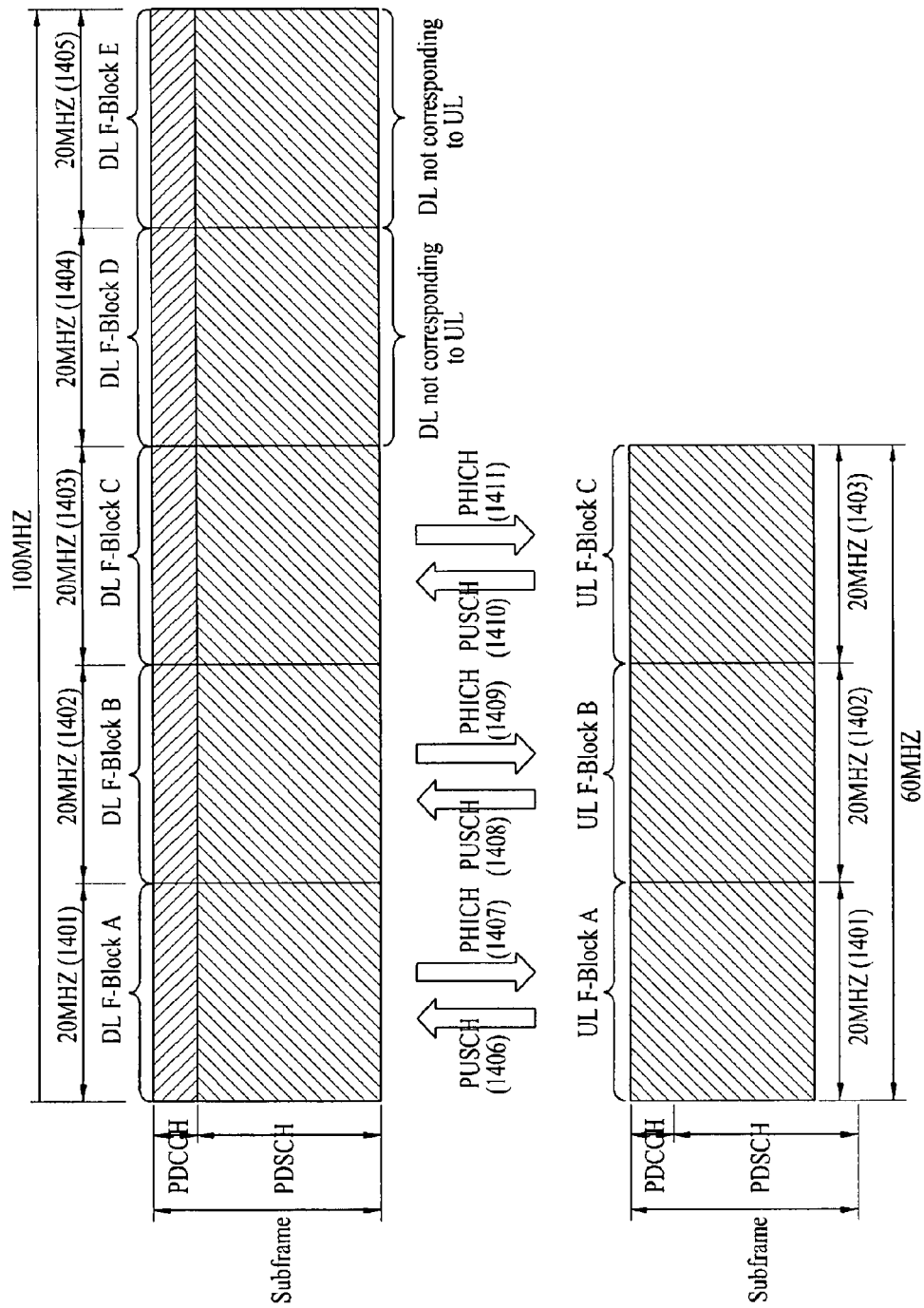

FIG. 15

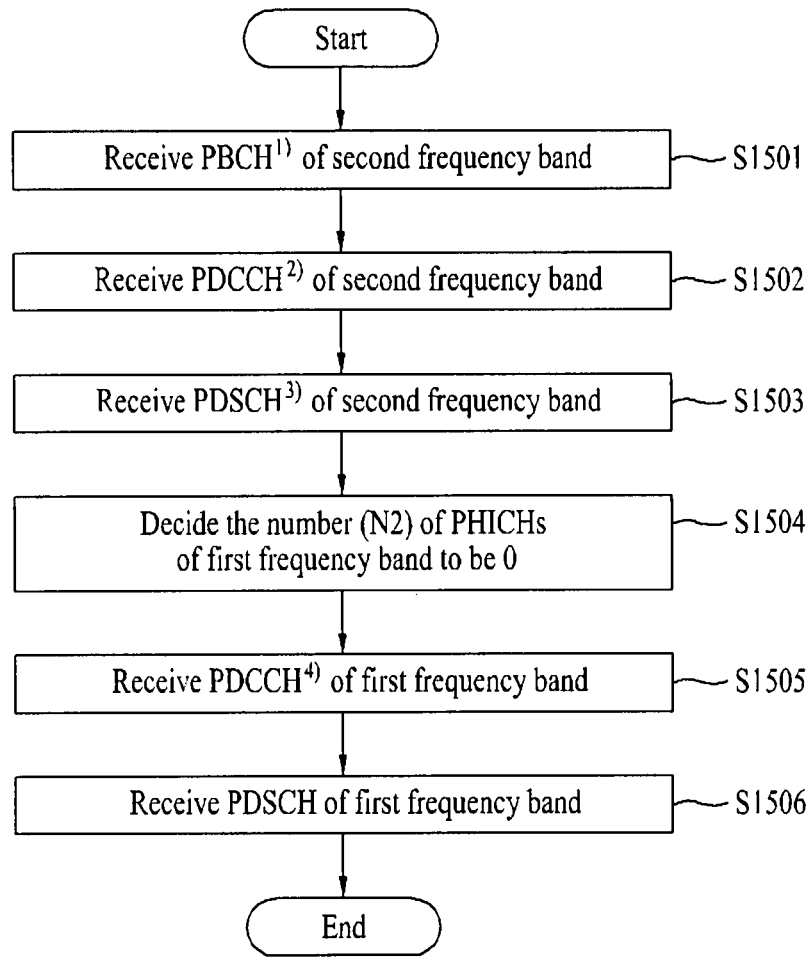

1) PBCH of second frequency band includes information indicating the number (N2) of PHICHs present in one subframe of second frequency band and information indicating the number (m2) of OFDM symbols mapped to the PHICHs in one subframe of the second frequency band.

2) PDCCH of second frequency band is identified by N2 and m2, and includes scheduling information of PDSCH of the second frequency band.

3) PDSCH of second frequency band includes signaling information indicating that the number of PHICHs present in one subframe of first frequency band is 0.

4) PDCCH of first frequency band is identified by information indicating that the number of PHICHs is 0, and includes scheduling information of PDSCH of the first frequency band.

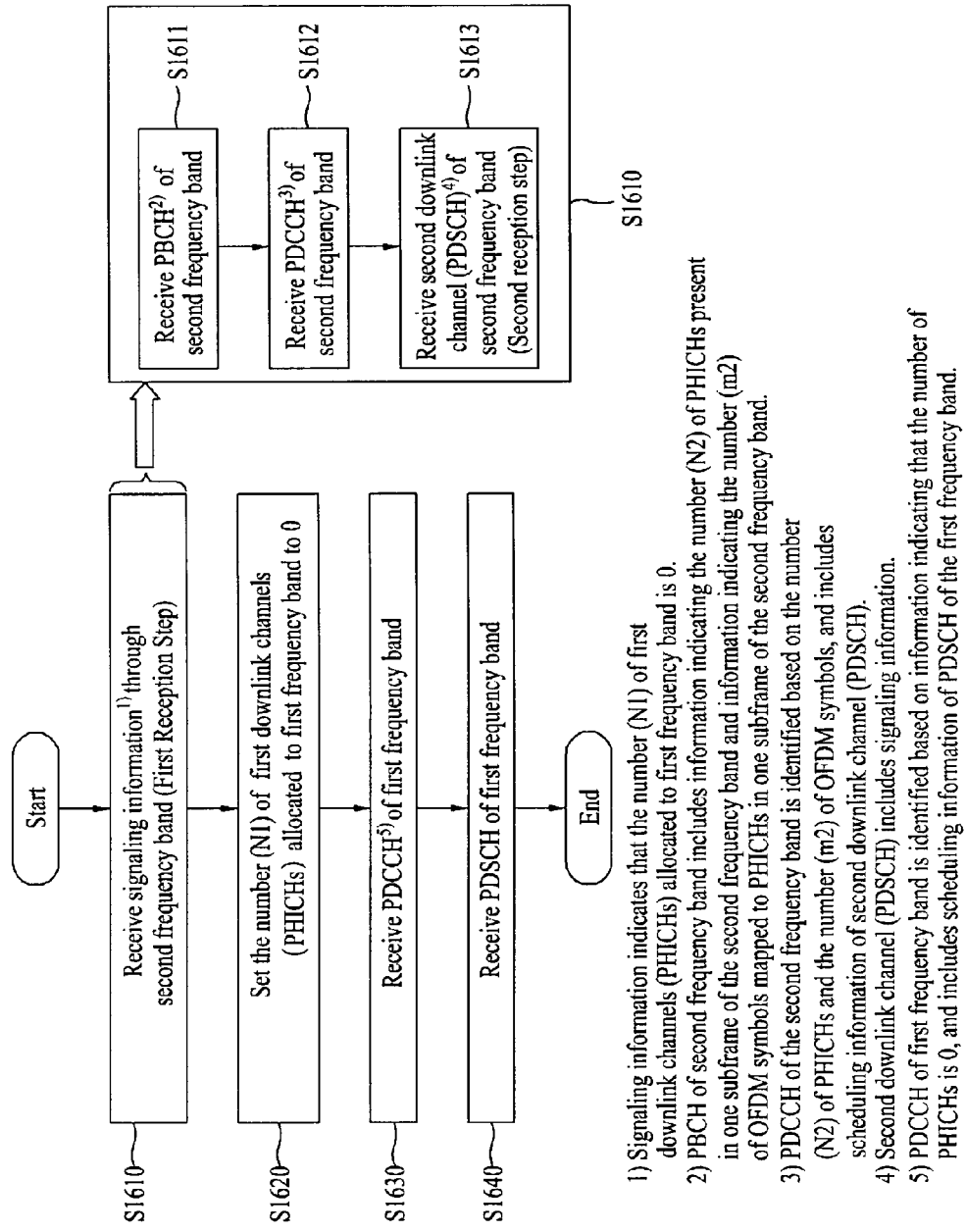

APPARATUS AND METHOD FOR TRANSCEIVING DOWNLINK CONTROL INFORMATION

This application is a 35 U.S.C. §371 National Stage entry of International Application No. PCT/KR2009/004500, filed on Aug. 12, 2009, and claims priority to U.S. Provisional Application No. 61/088,334, filed Aug. 12, 2008 and Korean Application No. 10-2009-0070060, filed on Jul. 30, 2009 each of which is hereby incorporated by reference in its entirety as if fully set forth herein.

TECHNICAL FIELD

The present invention relates to a wireless mobile communication system, and more particularly, to a method for transmitting and/or receiving information of the number of downlink channels in a wireless mobile communication system capable of using multiple carriers (or multi-carrier), and an apparatus for the same method.

BACKGROUND ART

As an example of the mobile communication system applicable to the present invention, a $3^{rd}$ Generation Partnership Project Long Term Evolution (3GPP LTE) communication system will hereinafter be described in detail.

FIG. 1 shows an Evolved Universal Mobile Telecommunications System (E-UMTS) network structure serving as an example of a mobile communication system.

The E-UMTS system is an evolved version of the conventional Universal Mobile Telecommunications System (UMTS) system and basic standardization thereof is in progress under the 3rd Generation Partnership Project (3GPP). Generally, the E-UMTS is also referred to as a Long Term Evolution (LTE) system.

The E-UMTS network may be classified into an Evolved-UMTS Terrestrial Radio Access Network (E-UTRAN) 101 and a Core Network (CN) 102. The E-UTRAN includes a UE 103, a BS (eNB or eNode B) 104a, ..., 104n, and an Access Gateway (AG) 105 which is located at an end of a network and is connected to an external network. The AG 105 can be divided into a part that handles processing of user traffic and a part that handles control traffic. Here, the AG part for processing new user traffic and the AG part for processing control traffic can communicate with each other using a new interface.

One or more cells may exist for one eNB. An interface for transmitting user traffic or control traffic can be used between eNBs. A Core Network (CN) 102 may include the AG 105 and a node or the like for user registration of the UE 103. An interface for discriminating between the E-UTRAN 101 and the CN 102 may be used.

Radio interface protocol layers between the UE and the network can be classified into an L1 layer (first layer), an L2 layer (second layer) and an L3 layer (third layer) on the basis of the lower three layers of the Open System Interconnection (OSI) reference model widely known in communication systems. A physical layer belonging to the L1 layer provides an information transfer service utilizing a physical channel. A Radio Resource Control (RRC) layer located at the L3 layer controls radio resources between the UE and the network. For this operation, RRC messages are exchanged between the UE and the network via the RRC layers. The RRC layers may be distributed among base stations (BSs) (104a, ..., 104n) and network nodes, or may be located only at base stations (BSs) (104a, ..., 104n) or the AG 105.

FIG. 2 and FIG. 3 illustrate radio interface protocol structures between a UE and a UTRAN that are based on a 3GPP radio access network standard.

The radio interface protocol of FIG. 2 or FIG. 3 is divided horizontally into a physical layer, a data link layer and a network layer, and vertically into a user plane for transmitting data information and a control plane for transmitting a control signal such as a signaling message. In more detail, FIG. 2 shows individual layers of a radio protocol control plane and FIG. 3 shows individual layers of a radio protocol user plane. Protocol layers of FIGS. 2 and 3 can be classified into an L1 layer (first layer), an L2 layer (second layer) and an L3 layer (third layer) on the basis of the lower three layers of the OSI reference model widely known in communication systems.

The following is a detailed description of respective layers of the radio protocol control plane of FIG. 2 and the radio protocol user plane of FIG. 3.

The physical layer, which is the first layer, provides an information transfer service to an upper layer using a physical channel. The physical layer (PHY) is connected to a Medium Access Control (MAC) layer, located above the physical layer, through a transport channel. Data is transferred between the MAC layer and the physical layer through the transport channel. In this case, the transport channel is classified into a dedicated transport channel and a common transport channel according to whether or not a channel is shared. Data transfer between different physical layers, specifically between the respective physical layers of a transmitter and a receiver, is performed through the physical channel.

A variety of layers exist in the second layer (L2 layer). The MAC layer maps various logical channels to various transport channels, and performs logical-channel multiplexing for mapping various logical channels to one transport channel. The MAC layer is connected to the RLC layer serving as an upper layer through a logical channel. The logical channel can be classified into a control channel for transmitting information of a control plane and a traffic channel for transmitting information of a user plane according to categories of transmission information.

The RLC layer of the second layer performs segmentation and concatenation on data received from an upper layer, and adjusts the size of data to be suitable for a lower layer transmitting data to a radio interval. In order to guarantee various Qualities of Service (QoSs) requested by respective radio bearers (RBs), three operation modes, i.e., a Transparent Mode (TM), an Unacknowledged Mode (UM), and an Acknowledged Mode (AM), are provided. Specifically, an AM RLC performs a retransmission function using an Automatic Repeat and Request (ARQ) function so as to implement reliable data transmission.

A Packet Data Convergence Protocol (PDCP) layer of the second layer (L2) performs a header compression function to reduce the size of an IP packet header having relatively large and unnecessary control information in order to efficiently transmit IP packets such as IPv4 or IPv6 packets in a radio interval with a narrow bandwidth. As a result, only information required for a header part of data can be transmitted, so that transmission efficiency of the radio interval can be increased. In addition, in the LTE system, the PDCP layer performs a security function, this security function is composed of a ciphering function for preventing a third party from eavesdropping on data and an integrity protection function for preventing a third party from handling data.

A Radio Resource Control (RRC) layer located at the top of the third layer (L3) is defined only in the control plane and is responsible for control of logical, transport, and physical channels in association with configuration, re-configuration and release of Radio Bearers (RBs). The RB is a logical path that the first and second layers (L1 and L2) provide for data communication between the UE and the UTRAN. Generally, Radio Bearer (RB) configuration means that a radio protocol layer needed for providing a specific service, and channel characteristics are defined and their detailed parameters and operation methods are configured. The Radio Bearer (RB) is classified into a Signaling RB (SRB) and a Data RB (DRB). The SRB is used as a transmission passage of RRC messages in the C-plane, and the DRB is used as a transmission passage of user data in the U-plane.

A downlink transport channel for transmitting data from the network to the UE may be classified into a Broadcast Channel (BCH) for transmitting system information and a downlink Shared Channel (SCH) for transmitting user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink shared channel (SCH) for transmission of user traffic or control messages.

Downlink physical channels for transmitting information transferred to a downlink transport channel to a radio interval between the UE and the network are classified into a Physical Broadcast Channel (PBCH) for transmitting BCH information, a Physical Multicast Channel (PMCH) for transmitting MCH information, a Physical Downlink Shared Channel (PDSCH) for transmitting downlink SCH information, and a Physical Downlink Control Channel (PDCCH) (also called a DL L1/L2 control channel) for transmitting control information, such as DL/UL Scheduling Grant information, received from first and second layers (L1 and L2). In the meantime, uplink physical channels for transmitting information transferred to an uplink transport channel to a radio interval between the UE and the network are classified into a Physical Uplink Shared Channel (PUSCH) for transmitting uplink SCH information, a Physical Random Access Channel for transmitting RACH information, and a Physical Uplink Control Channel (PUCCH) for transmitting control information, such as HARQ ACK or NACK Scheduling Request (SR) and Channel Quality Indicator (CQI) report information, received from first and second layers (L1 and L2).

DISCLOSURE

Technical Problem

An object of the present invention devised to solve the problem lies in a method for transmitting and receiving specific information indicating that downlink channels are not present in some carrier bands of a wireless mobile communication system based on multiple carriers, and/or an apparatus for the same method.

Technical Solution

The object of the present invention can be achieved by providing a method for receiving information indicating the number of downlink channels by a user equipment (UE) of a wireless mobile communication system including a first frequency band and a second frequency band, the method including a first reception step of receiving signaling information indicating that a number (N1) of first downlink channels allocated to the first frequency band is 0 through the second frequency band, and a decision step of deciding that the number (N1) of first downlink channels allocated to the first frequency band is 0.

In another aspect of the present invention, there is provided a user equipment (UE) for a wireless mobile communication system including a first frequency band and a second frequency band, the user equipment (UE) including a radio frequency (RF) unit, and a processor electrically connected to the RF unit, wherein the processor is configured to receive signaling information indicating that the number (N1) of first downlink channels allocated to the first frequency band is 0 through the second frequency band after passing through the RF unit, and decide that the number (N1) of first downlink channels allocated to the first frequency band is 0.

In another aspect of the present invention, there is provided a method for transmitting information indicating the number of downlink channels by a user equipment (UE) of a wireless mobile communication system including a first frequency band and a second frequency band, the method including transmitting a physical broadcast channel of the second frequency band, and transmitting signaling information indicating that the number (N1) of first downlink channels allocated to the first frequency band is 0 through the second frequency band.

In another aspect of the present invention, there is provided a base station (BS) for a wireless mobile communication system including a first frequency band and a second frequency band, the base station (BS) including a radio frequency (RF) unit, and a processor electrically connected to the RF unit, wherein the processor is configured to transmit a physical broadcast channel of the second frequency band, and transmit signaling information indicating that the number (N1) of first downlink channels allocated to the first frequency band is 0 through the second frequency band.

The signaling information may be transmitted through a Physical Downlink Shared Channel (PDSCH) of the second frequency band, and the first downlink channel may be a Physical Hybrid-ARQ Indicator Channel (PHICH).

The second downlink channel may be a Physical Downlink Shared Channel (PDSCH).

The first reception step may further include, before performing the second reception step, receiving a Physical Broadcast Channel (PBCH) of the second frequency band, and receiving a Physical Downlink Control Channel (PDCCH) of the second frequency band.

The PBCH of the second frequency band may include information indicating the number (N2) of PHICHs present in one subframe of the second frequency band and information indicating the number (m2) of Orthogonal Frequency Division Multiplexing (OFDM) symbols mapped to the PHICHs in one subframe of the second frequency band, the PDCCH of the second frequency band may be identified based on the number (N2) of PHICHs and the number (m2) of OFDM symbols, and the PDCCH of the second frequency band may include scheduling information of the second downlink channel.

The method for receiving information indicating the number of downlink channels may further include, after performing the decision step, receiving a Physical Downlink Control Channel (PDCCH) of the first frequency band, and receiving a Physical Downlink Shared Channel (PDSCH) of the first frequency band.

The PDCCH of the first frequency band may be identified by a predetermined equation based on information indicating that the number (N1) of PHICHs present in the first frequency band is 0.

The processor may be configured to receive a second downlink channel of the second frequency band through the RF unit, wherein the second downlink channel may include signaling information indicating that the number of first downlink channels allocated to the first frequency band is 0.

The processor may be configured to receive a Physical Broadcast Channel (PBCH) of the second frequency band, and may receive a Physical Downlink Control Channel (PDCCH) of the second frequency band.

The processor may be configured to receive a Physical Downlink Control Channel (PDCCH) of the first frequency band, and may receive a Physical Downlink Shared Channel (PDSCH) of the first frequency band.

Advantageous Effects

The present invention can wirelessly indicate whether a specific downlink channel exists in a carrier band not including some uplink channels in a wireless mobile communication system based on multiple carriers.

DESCRIPTION OF DRAWINGS

The accompanying drawings, which are included to provide a further understanding of the invention, illustrate embodiments of the invention and together with the description serve to explain the principle of the invention.

In the drawings:

FIG. 13 is a conceptual diagram illustrating a process for transmitting PUSCH and PHICH through an uplink and a downlink.

FIG. 14 exemplarily shows an uplink/downlink (UL/DL) communication concept in a wireless mobile communication system in which a plurality of frequency bands is established.

FIG. 15 is a flowchart illustrating a method for allowing a UE to receive PDSCH of a frequency band having no uplink channels in a mobile communication system including a plurality of frequency bands according to one embodiment of the present invention.

FIG. 16 is a flowchart illustrating a method for allowing a UE to receive PDSCH of a frequency band having no uplink channels in a mobile communication system including a plurality of frequency bands according to another embodiment of the present invention.

MODE FOR INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. For example, the following description will be given centering upon a mobile communication system serving as a 3GPP LTE system, but the present invention is not limited thereto and the remaining parts of the present invention other than unique characteristics of the 3GPP LTE system are applicable to other mobile communication systems.

In some cases, in order to prevent ambiguity of the concepts of the present invention, conventional devices or apparatuses well known to those skilled in the art will be omitted and be denoted in the form of a block diagram on the basis of the important functions of the present invention. Wherever possible, the same reference numbers will be used throughout the drawings to refer to the same or like parts.

In the following description, a terminal may include mobile or fixed user equipments (UEs), for example, a user equipment (UE), a mobile station (MS) and the like, and may also be referred to in any of these ways as necessary. Also, the base station (BS) may include a Node B (Node-B) and an eNode B (eNode-B), and may also be referred to in any of these ways.

In a mobile communication system, a UE can receive information from a base station (BS) via a downlink, and the UE can also transmit information via an uplink. Information transferred from- or received in- the UE may be data, other control information, and the like, and there are a variety of physical channels according to usages of this information transferred or received from or in the UE.

Figure 4:
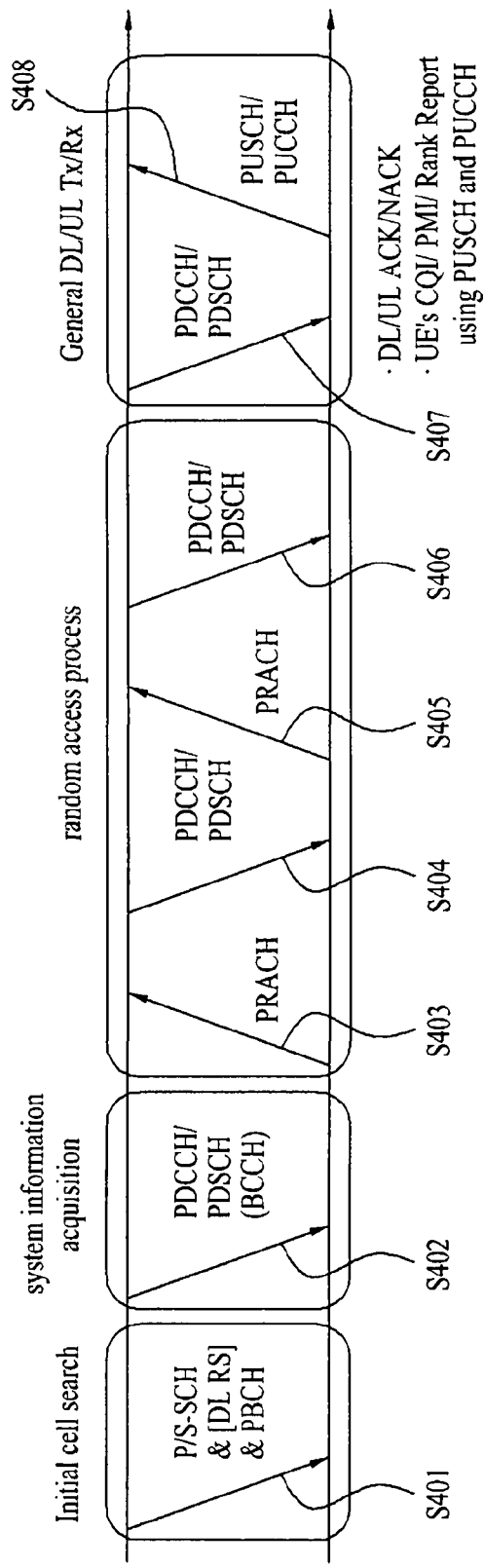
FIG. 4 shows physical channels used for a 3GPP LTE system serving as an example of a mobile communication system and a general signal transmission method capable of using the physical channels.

FIG. 4 shows physical channels used for a 3GPP LTE system serving as an example of a mobile communication system and a general signal transmission method capable of using the physical channels.

If a UE is re-powered on after being powered off or newly enters a cell region, the UE performs an initial cell search process, such as synchronization with a base station (BS), at step S401. For the initial cell search process, the UE receives a Primary Synchronization Channel (P-SCH) and a Secondary Synchronization Channel (S-SCH) from the base station (BS), is synchronized with the BS, and is able to acquire information such as a cell ID or the like from the BS. After that, the UE receives a physical broadcast channel from the BS, such that it can acquire inter-cell broadcast information from the BS. In the meantime, the UE receives a downlink reference signal (DL RS) at the initial cell searching step, so that it can recognize a downlink channel status.

After performing the initial cell search process, the UE receives a Physical Downlink Control Channel (PDCCH) and a Physical Downlink Shared Control Channel (PDSCH) based on the PDCCH information, so that it can acquire more detailed system information at step S402.

In the meantime, if a UE initially accesses the BS or has no resources for uplink transmission, the UE can perform a Random Access Procedure (RAP), such as steps S403 to S406, for the BS. For this operation, the UE transmits a specific sequence as a preamble through a Physical Random Access Channel (PRACH) at step S403, and receives a response message to the random access through a PDCCH and a PDSCH at step S404. In case of a competitive-based random access except for a handover case, a contention resolution procedure such as step S405 or S406 can then be carried out. At step S405, information is transmitted through an additional PRACH. At step S406, PDCCH/PDSCH information is received.

After performing the above-mentioned steps, as a procedure for transmitting UL/DL signals, the UE receives a PDCCH and a PDSCH at step S407, and transmits a Physical Uplink Shared Channel (PUSCH) and a Physical Uplink Control Channel (PUCCH) at step S408.

In the 3GPP LTE system, a signaling process for transmitting UL/DL signals is as follows.

Figure 5:
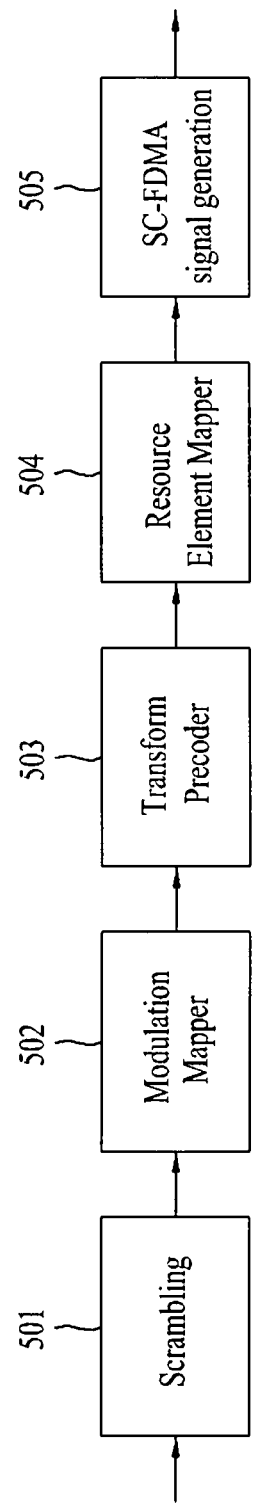
FIG. 5 is a conceptual diagram illustrating signal processing for enabling a UE to transmit an uplink signal.

FIG. 5 is a conceptual diagram illustrating signal processing for enabling a UE to transmit an uplink (UL) signal.

In order to transmit a UL signal, a scrambling module 501 of the UE can scramble a transmission signal using a specific scrambling signal of the UE. The scrambled signal is input to a modulation mapper 502, and is converted into a complex symbol using a BPSK-, QPSK-, or 16 QAM-scheme according to categories of the transmission signal and/or a channel status. After that, the modulated complex symbol is processed by a transform precoder 503, and is then input to the resource element mapper 504. The resource element mapper 504 is able to map a complex symbol to a time-frequency element to be used for actual transmission. The processed signal may be transmitted to the base station (BS) via the SC-FDMA signal generator 505.

Figure 6:
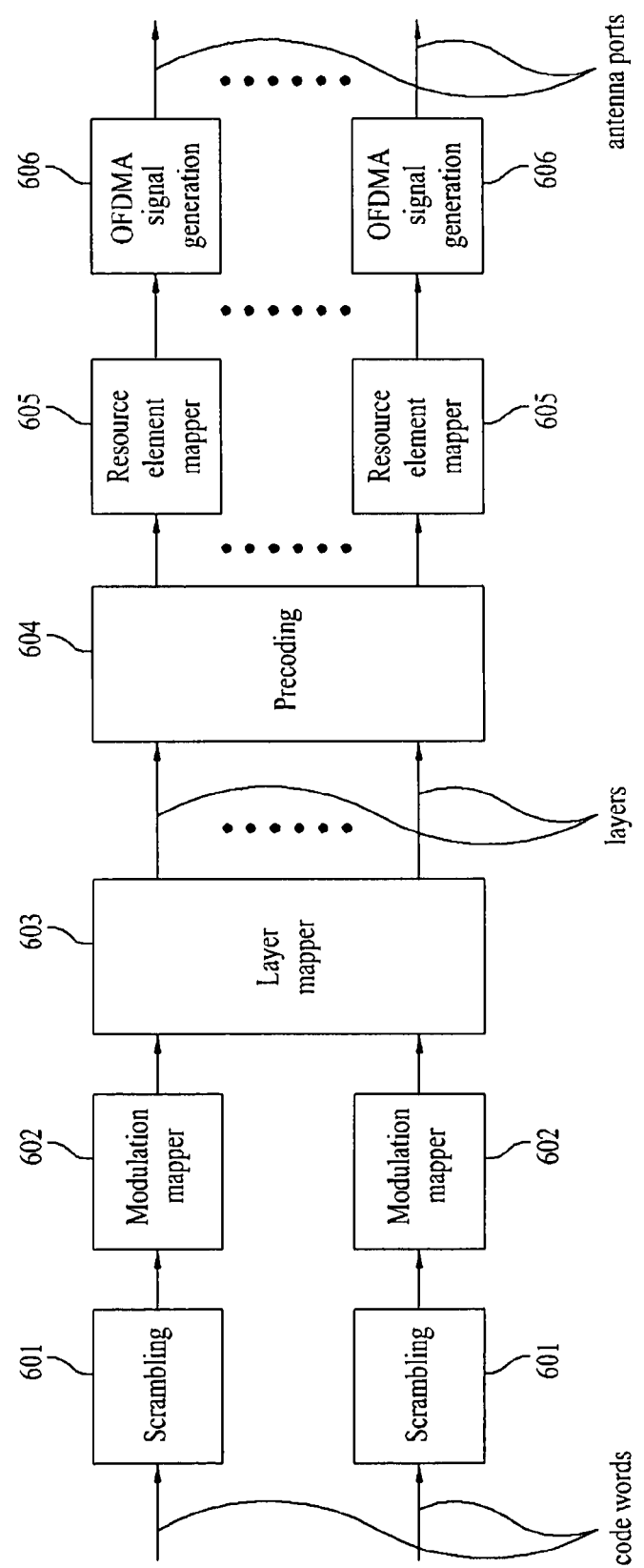
FIG. 6 is a conceptual diagram illustrating signal processing for enabling a base station (BS) to transmit a downlink signal.

FIG. 6 is a conceptual diagram illustrating signal processing for enabling the base station (BS) to transmit a downlink signal.

In the 3GPP LTE system, the BS is able to transmit one or more codewords via a downlink. Therefore, one or more codewords may be processed as complex symbols by the scrambling module 601 and the modulation mapper 602 in the same manner as in the uplink case of FIG. 5. Thereafter, the complex symbols are mapped to a plurality of layers by the layer mapper 603, and each layer may be multiplied by a predetermined precoding matrix selected depending on a channel status and may then be allocated to each transmission antenna by the precoding module 604. The processed transmission signal for each antenna is mapped to a time-frequency resource element to be used for transmission by the resource element mapper 605. After that, the mapped result can be transmitted via each antenna after passing through the OFDMA signal generator 606.

In the case where a UE for use in a mobile communication system transmits an uplink signal, a Peak to Average Power Ratio (PAPR) may become more serious than in the case where the BS transmits a downlink signal. Thus, as described in FIG. 5 and FIG. 6, the SC-FDMA scheme is used for uplink signal transmission in a different way from the OFDMA scheme used for downlink signal transmission.

In the 3GPP LTE system, the SC-FDMA scheme for uplink signal transmission and the OFDMA scheme for downlink signal transmission will hereinafter be described in detail.

Figure 7:
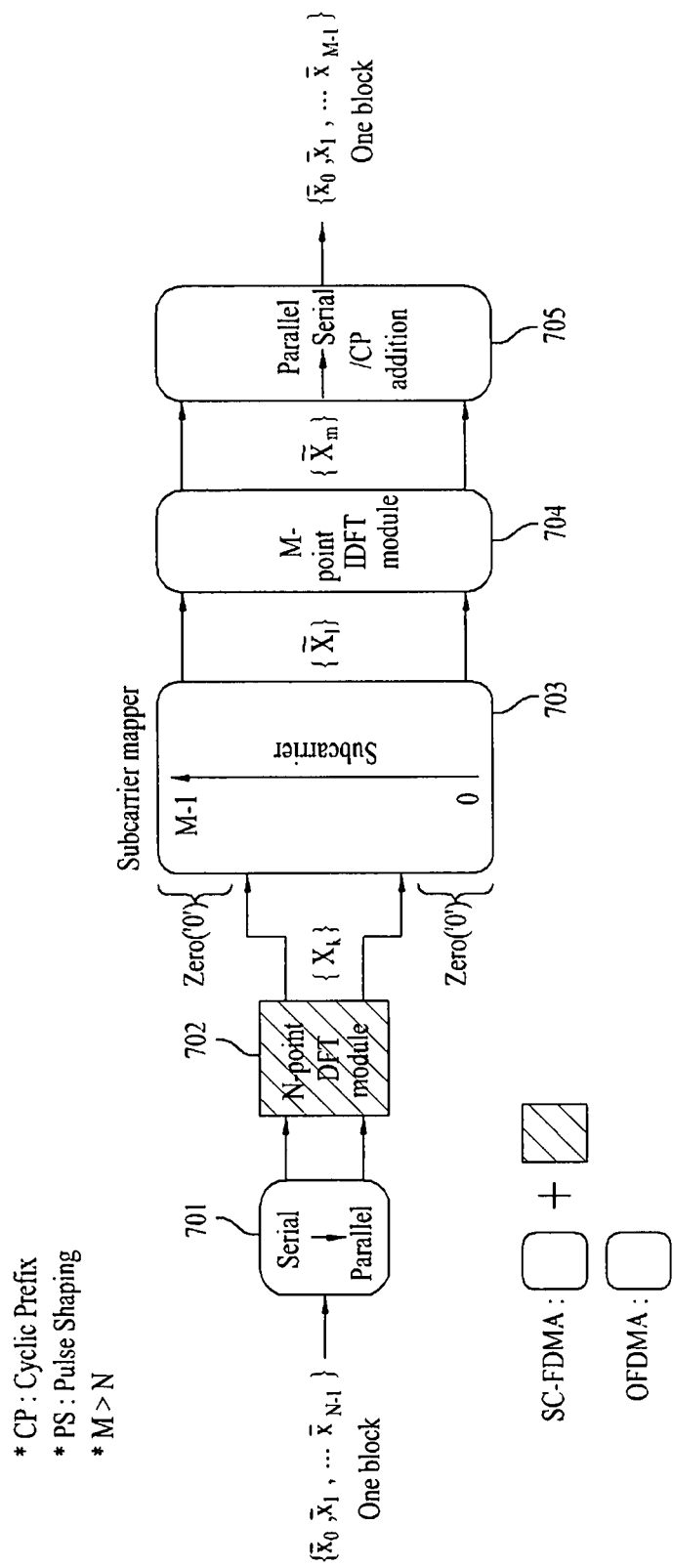
FIG. 7 is a conceptual diagram illustrating an SC-FDMA scheme for transmitting an uplink signal and an OFDMA scheme for transmitting a downlink signal in a mobile communication system.

FIG. 7 is a conceptual diagram illustrating the SC-FDMA scheme for uplink signal transmission and the OFDMA scheme for downlink signal transmission in a mobile communication system.

Referring to FIG. 7, not only a UE for transmitting an uplink signal but also a base station (BS) for transmitting a downlink signal includes a Serial-to-Parallel converter 701, a subcarrier mapper 703, an M-point IDFT module 704, a Parallel-to-Serial converter 705, and the like. However, a UE for transmitting a signal using the SC-FDMA scheme further includes an N-point DFT module 702, and compensates for a predetermined part of the IDFT processing influence of the M-point IDFT module 704 so that a transmission signal can have single carrier characteristics.

A frame structure for use in the 3GPP LTE system will hereinafter be described. The 3GPP LTE system supports a type 1 radio frame structure applicable to frequency division duplex (FDD), and a type 2 radio frame structure applicable to time division duplex (TDD).

Figure 8:
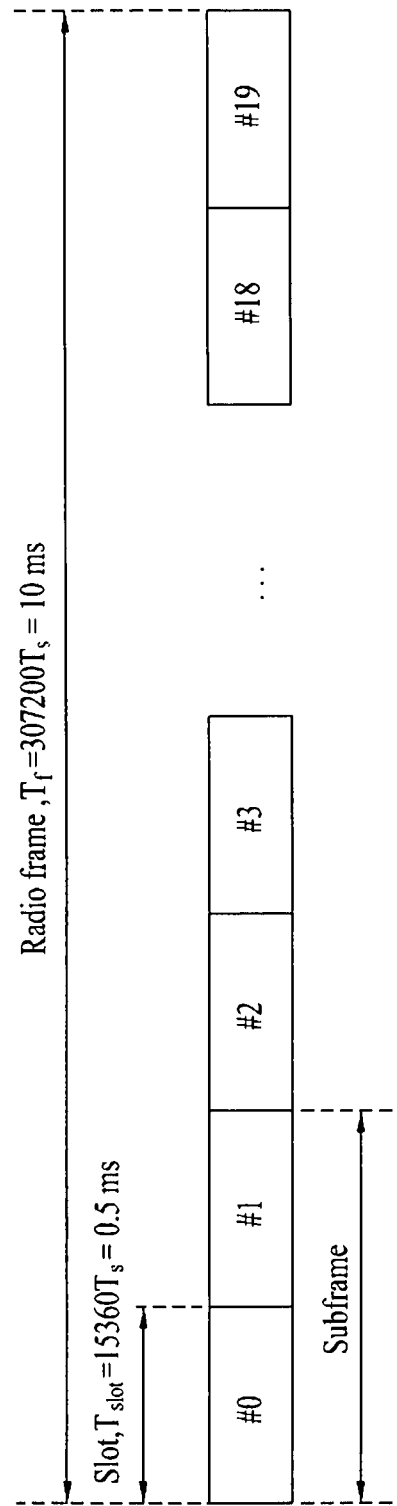
FIG. 8 shows a structure of a type 1 radio frame used in a 3GPP LTE system.

FIG. 8 shows a structure of a type 1 radio frame used in the 3GPP LTE system. The type 1 radio frame includes 10 subframes, each of which consists of two slots. A time length of each constituent unit is shown in FIG. 8.

Figure 9:
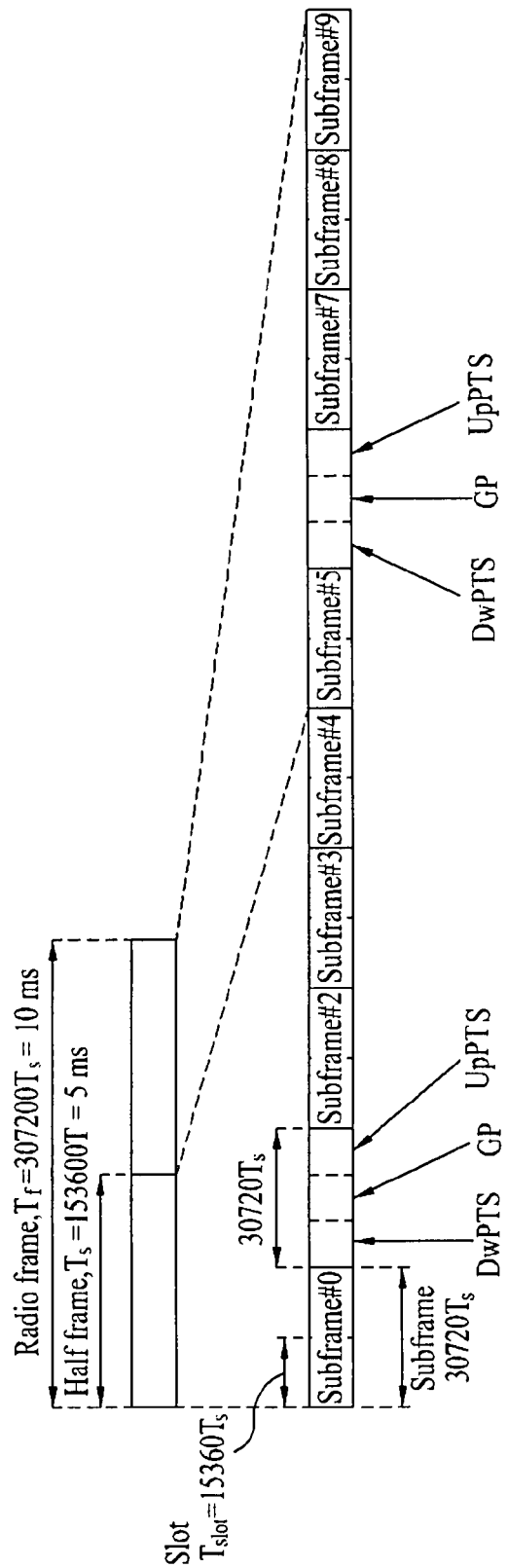
FIG. 9 shows a structure of a type 2 radio frame used in a 3GPP LTE system.

FIG. 9 shows a structure of a type 2 radio frame used in the 3GPP LTE system. The type 2 radio frame includes two half-frames, each of which is composed of five subframes, a downlink piloting time slot (DwPTS), a guard period (GP), and an uplink piloting time slot (UpPTS), in which one subframe consists of two slots. That is, one subframe is composed of two slots irrespective of the radio frame type. A time length of each constituent unit is shown in FIG. 9.

A resource grid structure for use in the 3GPP LTE system will hereinafter be described in detail.

Figure 10:
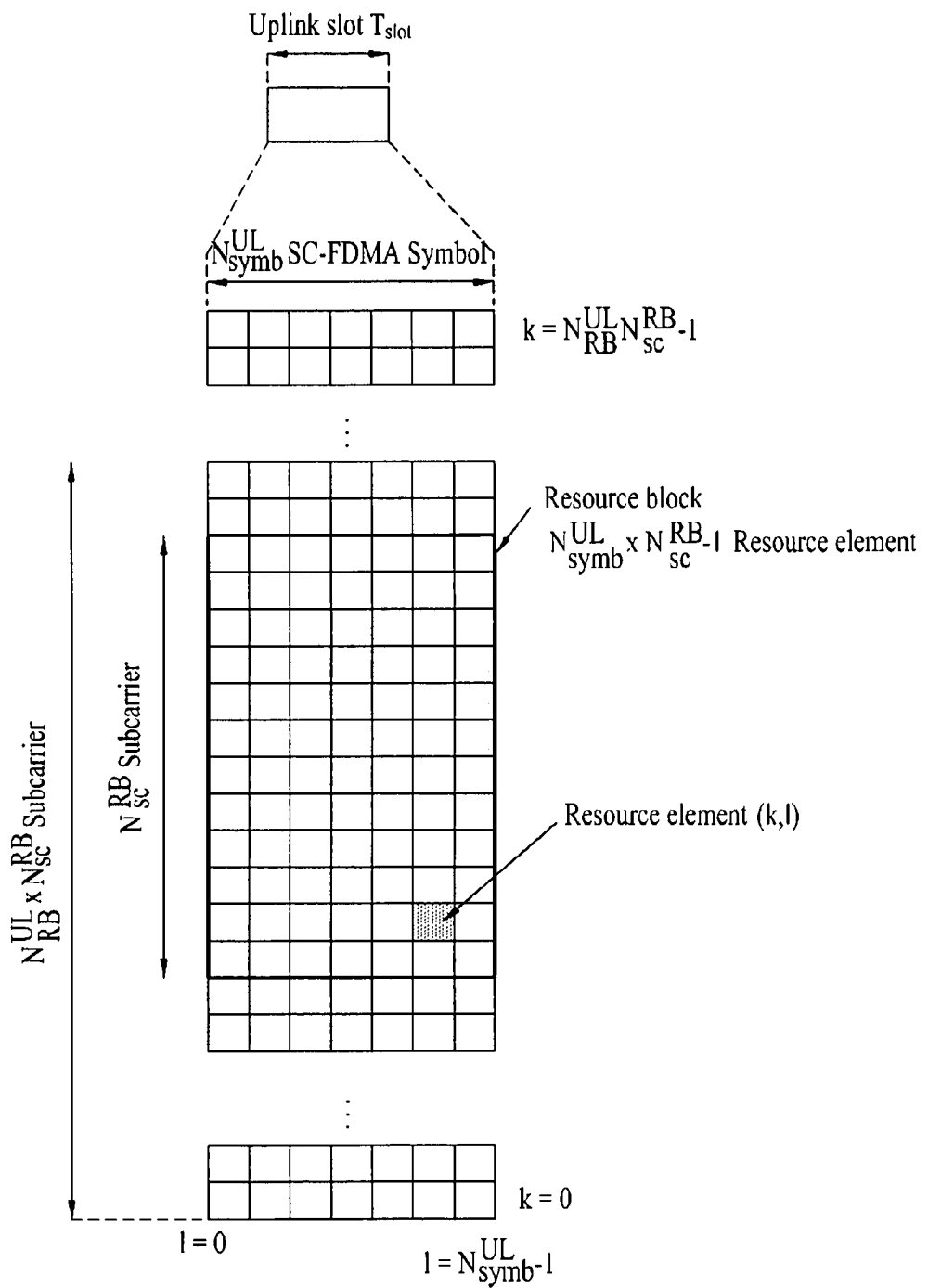
FIG. 10 shows an uplink time-frequency resource grid structure for use in the 3GPP LTE system.

FIG. 10 shows an uplink time-frequency resource grid structure for use in the 3GPP LTE system.

Referring to FIG. 10, an uplink signal transmitted from each slot can be described by a resource grid including $N_{RB}^{UL} N_{SC}^{RB}$ subcarriers and $N_{symb}^{UL}$ Single Carrier-Frequency Division Multiple Access (SC-FDMA) symbols. Here, $N_{RB}^{UL}$ represents the number of resource blocks (RBs) in an uplink, $N_{SC}^{RB}$ represents the number of subcarriers constituting one RB, and $N_{symb}^{UL}$ represents the number of SC-FDMA symbols in one uplink slot. $N_{RB}^{UL}$ varies with an uplink transmission bandwidth constructed in a cell, and must satisfy $N_{RB}^{min,UL} \leq N_{RB}^{UL} \leq N_{RB}^{max,UL}$. Here, $N_{RB}^{min,UL}$ is the smallest uplink bandwidth supported by a wireless communication system, and $N_{RB}^{max,UL}$ is the largest uplink bandwidth supported by the wireless communication system. Although $N_{RB}^{min,UL}$ may be set to 6 ($N_{RB}^{min,UL}=6$) and $N_{RB}^{max,UL}$ may be set to 110 ($N_{RB}^{max,UL}=110$), the scopes of $N_{RB}^{min,UL}$ and $N_{RB}^{max,UL}$ are not limited thereto. The number of SC-FDMA symbols contained in one slot may be differently defined according to the length of a Cyclic Prefix (CP) and the spacing between subcarriers.

Each element contained in the resource grid is called a resource element (RE), and can be identified by an index pair (k,l) contained in a slot, where k is an index in a frequency domain and is set to any one of $0, \ldots, N_{RB}^{UL} N_{SC}^{RB} - 1$, and $l$ is an index in a time domain and is set to any one of $0, \ldots, N_{symb}^{UL} - 1$.

A Physical Resource Block (PRB) is defined by $N_{symb}^{UL}$ consecutive SC-FDMA symbols in a time domain and $N_{SC}^{RB}$ consecutive subcarriers in a frequency domain. $N_{symb}^{UL}$ and $N_{SC}^{UL}$ may be predetermined values, respectively. For example, $N_{symb}^{UL}$ and $N_{SC}^{RB}$ may be given as shown in the following Table 1. Therefore, one PRB in an uplink may be composed of $N_{symb}^{UL} \times N_{SC}^{RB}$ resource elements. In addition, one PRB may correspond to one slot in a time domain and 180 kHz in a frequency domain. A PRB number $n_{PRB}$ and a resource element index $(k,l)$ in a slot can satisfy a predetermined relationship denoted by $$n_{PRB} = \left\lfloor \frac{k}{N_{sc}^{RB}} \right\rfloor.$$

TABLE 1

| Configuration | $N_{SC}^{RB}$ | $N_{symb}^{UL}$ |
|---|---|---|
| Normal Cyclic Prefix | 12 | 7 |
| Extended Cyclic Prefix | 12 | 6 |

Figure 11:
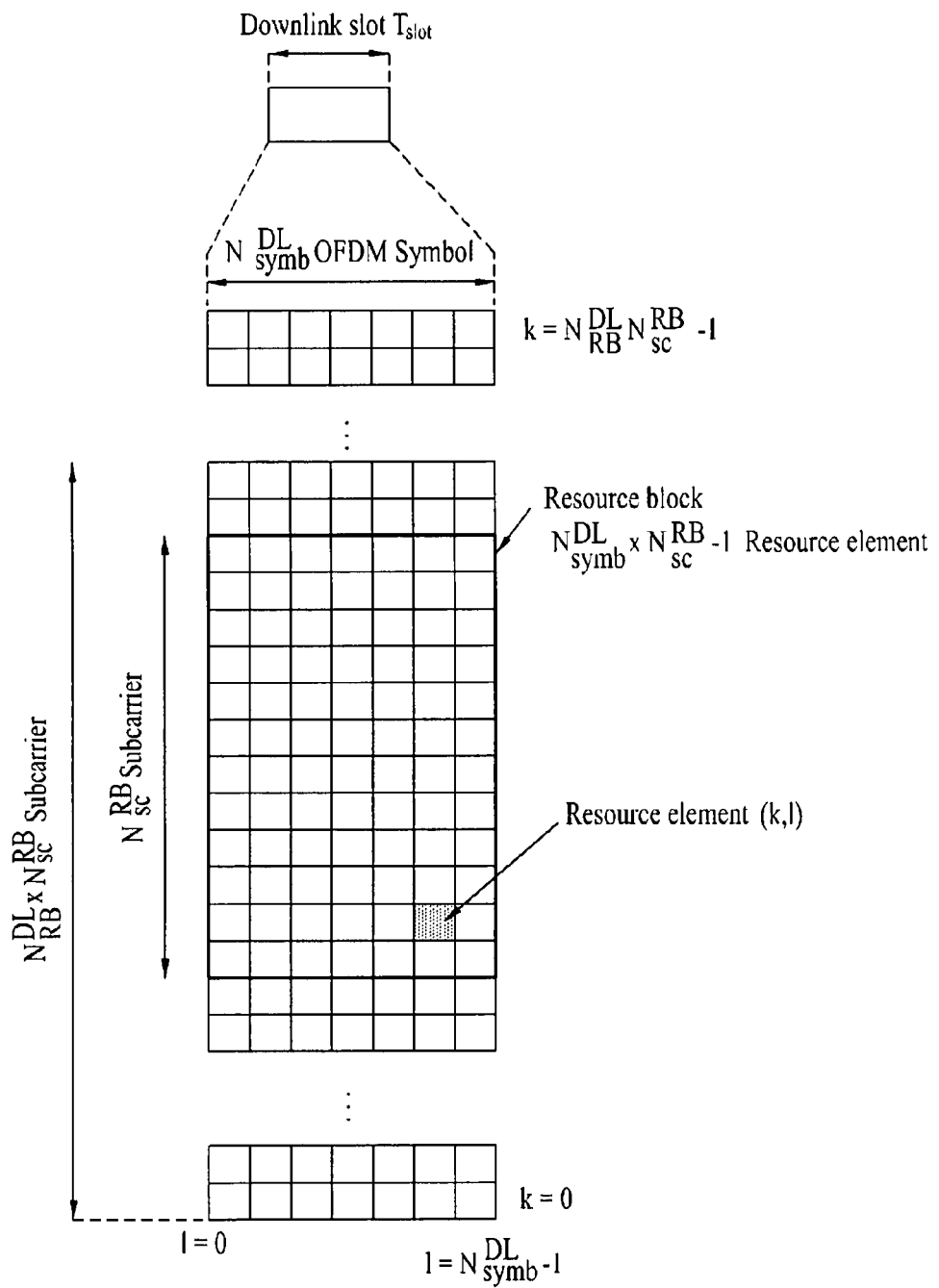
FIG. 11 shows a downlink time-frequency resource grid structure for use in the 3GPP LTE system.

FIG. 11 shows a downlink time-frequency resource grid structure for use in the 3GPP LTE system.

Referring to FIG. 11, a downlink signal transmitted from each slot can be described by a resource grid including $N_{RB}^{DL}$ $N_{SC}^{RB}$ subcarriers and $N_{symb}^{DL}$ OFDM symbols. Here, $N_{RB}^{DL}$ represents the number of resource blocks (RBs) in a downlink, $N_{SC}^{RB}$ represents the number of subcarriers constituting one RB, and $N_{symb}^{DL}$ represents the number of OFDM symbols in one downlink slot. $N_{RB}^{DL}$ varies with an uplink transmission bandwidth constructed in a cell, and must satisfy $N_{RB}^{min,DL} \leq N_{RB}^{DL} \leq N_{RB}^{max,DL}$. Here $N_{RB}^{min,DL}$ is the smallest uplink bandwidth supported by a wireless communication system, and $N_{RB}^{max,DL}$ is the largest uplink bandwidth supported by the wireless communication system. Although $N_{RB}^{min,DL}$ may be set to 6 ($N_{RB}^{min,DL}=6$) and $N_{RB}^{max,DL}$ may be set to 110 ($N_{RB}^{max,DL}=110$), the scopes of $N_{RB}^{min,DL}$ and $N_{RB}^{max,DL}$ are not limited thereto. The number of OFDM symbols contained in one slot may be differently defined according to the length of a Cyclic Prefix (CP) and the subcarrier spacing. When transmitting data or information via multiple antennas, one resource grid for each antenna port may be defined.

Each element contained in the resource grid is called a resource element (RE), and can be identified by an index pair $(k,l)$ contained in a slot, where $k$ is an index in a frequency domain and is set to any one of $0, \ldots, N_{RB}^{DL} N_{sc}^{RB} - 1$, and $l$ is an index in a time domain and is set to any one of $0, \ldots, N_{symb}^{DL} - 1$.

Resource blocks (RBs) shown in FIG. 10 and FIG. 11 are used to describe a mapping relationship between certain physical channels and resource elements (REs). The RBs can be classified into physical resource blocks (PRBs) and virtual resource blocks (VRBs). Although the above mapping relationship between the VRBs and the PRBs has been disclosed on a downlink basis, the same mapping relationship may also be applied to an uplink.

One PRB is defined by $N_{symb}^{DL}$ consecutive OFDM symbols in a time domain and $N_{SC}^{RB}$ consecutive subcarriers in a frequency domain. $N_{symb}^{DL}$ and $N_{SC}^{RB}$ may be predetermined values, respectively. For example, $N_{symb}^{DL}$ and $N_{SC}^{RB}$ may be given as shown in the following Table 2. Therefore, one PRB may be composed of $N_{symb}^{DL} \times N_{SC}^{RB}$ resource elements. One PRB may correspond to one slot in a time domain and may also correspond to 180 kHz in a frequency domain, but it should be noted that the scope of the present invention is not limited thereto.

TABLE 2

| Configuration | | $N_{SC}^{RB}$ | $N_{symb}^{DL}$ |
|---|---|---|---|
| Normal Cyclic Prefix | $\Delta f$ = 15 kHz | 12 | 7 |
| Extended Cyclic Prefix | $\Delta f$ = 15 kHz | | 6 |
| | $\Delta f$ = 7.5 kHz | 24 | 3 |

The PRBs are assigned numbers from 0 to $N_{RB}^{DL} - 1$ in the frequency domain. A PRB number $n_{PRB}$ and a resource element index $(k,l)$ in a slot can satisfy a predetermined relationship denoted by $$n_{PRB} = \left\lfloor \frac{k}{N_{sc}^{RB}} \right\rfloor.$$

The VRB may have the same size as that of the PRB. There are two types of VRBs defined, the first one being a localized VRB (LVRB) and the second one being a distributed type (DVRB). For each VRB type, a pair of VRBs in two slots of one subframe may assigned a single VRB number $n_{VRB}$.

The VRB may have the same size as that of the PRB. Two types of VRBs are defined, the first one being a localized VRB (LVRB) and the second one being a distributed VRB (DVRB). For each VRB type, a pair of PRBs may have a single VRB index (which may hereinafter be referred to as a 'VRB number') and are allocated over two slots of one subframe. In other words, $N_{RB}^{DL}$ VRBs belonging to a first one of two slots constituting one subframe are each assigned any one index of 0 to $N_{RB}^{DL} - 1$, and $N_{RB}^{DL}$ VRBs belonging to a second one of the two slots are likewise each assigned any one index of 0 to $N_{RB}^{DL} - 1$.

Some channels for use in the 3GPP LTE system will hereinafter be described. In the 3GPP LTE system, when a UE transmits data via a Physical Uplink Shared Channel (PUSCH), a Physical Hybrid—ARQ Indicator Channel (PHICH) is a channel for transmitting downlink ACK/NACK information used as a reception response for the PUSCH. That is, the PHICH is a channel for transmitting downlink ACK/NACK information for an uplink hybrid—ARQ (UL HARQ). In the 3GPP LTE system, a Physical Control Format Indicator Channel (PCFICH) is a transmission channel used when the length of OFDM symbols for a Physical Downlink Control Channel (PDCCH) is longer than zero (0), and indicates format- and size-information of the PDCCH. For example, PCFICH may inform the UE of the number of OFDM symbols used for the PDCCH. In the 3GPP LTE system, the PDCCH may be a channel for indicating UL/DL data scheduling information. In the 3GPP LTE system, a Physical Broadcast Channel (PBCH) may be a channel for providing specific information such as a system bandwidth during a cell searching process. In the 3GPP LTE system, a Physical Downlink Shared Channel (PDSCH) is a channel for transmitting general downlink data for a user.

A method for receiving uplink/downlink (UL/DL) data scheduling information via a PDCCH in a 3GPP LTE system will hereinafter be described.

In the 3GPP LTE system, PHICH signals may be transmitted via first m OFDM symbols (where m≤1) among OFDM symbols of each subframe, PDCCH signals may be transmitted via the remaining resource elements (REs) except resource element (REs) via which control signals such as PHICH and PCFICH signals in first n OFDM symbols (where m≤n) of the subframe. Therefore, in order to allow the UE to receive UL/DL data scheduling information via a PDCCH of each subframe, the UE must recognize how PHICHs are mapped to the subframe. PHICH mapping in each subframe of each cell is decided by two factors, i.e., the number (N) of PHICHs present in the subframe and the number (m) of OFDM symbols mapped to the PHICHs in this subframe. Thus, the UE must recognize the values of N and m so as to receive PDCCH information of each subframe.

Figure 12:
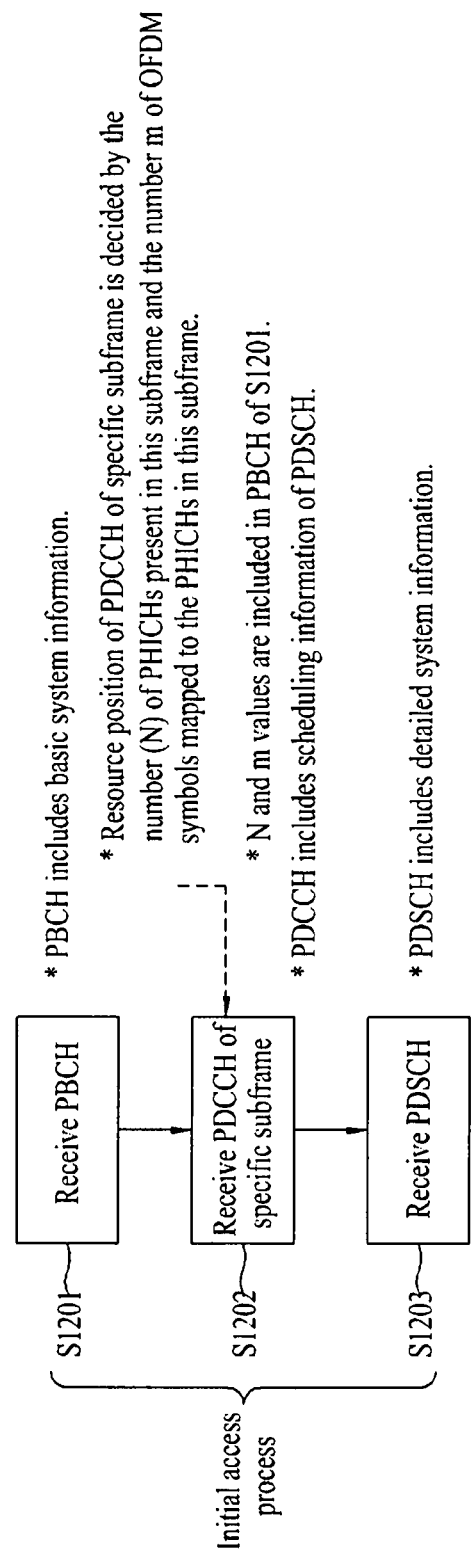
FIG. 12 is a flowchart illustrating a method for receiving uplink/downlink (UL/DL) data scheduling information.

FIG. 12 is a flowchart illustrating a method for receiving UL/DL data scheduling information.

Referring to FIG. 12, when a UE attempts to perform an initial access to a specific cell, the UE receives PBCH information transmitted via a downlink of this cell at step S1201. After the UE acquires basic system information such as a system bandwidth of the cell, the UE receives PDSCH information at step S1203, so that it acquires more detailed system information. In this case, PDSCH scheduling information is transmitted via a PDCCH of each subframe, so that the UE operating in the initial access receives PBCH information and then receives PDCCH information of a specific subframe at step S1202. As a result, the UE is able to recognize scheduling information of a PDSCH for transmitting more detailed system information through the above subframe, and receives information of the PDSCH at step S1203 so that it can recognize more detailed system information. Thus, because a UE attempting to perform the initial access must recognize N and m values before acquiring detailed system information via a PDSCH, the N and m values must be contained in basic system information of the PBCH and therefore the resultant PBCH basic system information including the N and m values should be reported to the UE.

In more detail, in a structure for transmitting PHICH information, In-phase/Quadrature (I/Q) multiplexing is performed with a condition of SF=4 ($N_{SF}^{PHICH}$=4) in a subframe with a Normal Cyclic Prefix (Normal CP), so that there arises a specific pattern in which four resource elements are repeated three times. In this case, the Spreading Factor (SF) indicates a spreading rate. Therefore, eight PHICHs construct one PHICH group on a total of 12 resource elements (REs), as denoted by ($n_{PHICH}^{seq}$=0, 1, 2, ..., 7), such that they can be transmitted in the form of such a group. In a subframe with an Extended CP, I/Q multiplexing is performed with a condition of SF=2 ($N_{SF}^{PHICH}$=2), so that there arises a specific pattern in which two resource elements are repeated three times. Therefore, four PHICHs construct one PHICH group on a total of six REs, as denoted by ($n_{PHICH}^{seq}$=0, 1, 2, 3), such that they can be transmitted in the form of such a group.

In the meantime, the number of users generally varies with system bands. PHICH is a reception response (i.e., ACK/NACK response) for a PUSCH via which the UE transmits uplink data, so that the number (N) of PHICHs present in each subframe should be established to be variable with the uplink system band. However, because the uplink system band can be recognized only after the UE receives PDSCH information at step S1203 and acquires detailed system information, a uplink system band information is unable to be used for establishing the number (N) of PHICHs present in each subframe. As a result, the related art has established the N value on the basis of a downlink system band. Information of the downlink system band is transmitted via a PBCH, and information of the uplink system band is transmitted via a PDSCH.

In more detail, the ratio $N_g$ of the number of RBs of an overall downlink band to the number of PHICHs is signaled, such that the number $N_{PHICH}^{group}$ of PHICH groups can be calculated using the following equation 1

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad \text{[Equation 1]}$$

In Equation 1, $N_g$ is selected among four values {⅙, ½, 1, 2}, and is then signaled.

The number of PHICH groups contained in one subframe is $N_{PHICH}^{group}$. In case of the normal cyclic prefix, eight PHICHs are contained in each PHICH group, as denoted by ($n_{PHICH}^{seq}$=0, 1, 2, ..., 7). In case of the extended cyclic prefix, four PHICHs are contained in each PHICH group, as denoted by ($n_{PHICH}^{seq}$=0, 1, 2, 3). The number (N) of PHICHs contained in each subframe is set to N=$N_{PHICH}^{group}$×8 when the normal cyclic prefix is used, and is set to N=$N_{PHICH}^{group}$×4 when the extended cyclic prefix is used. For example, in the case where a system band has the size corresponding to 25 resource blocks (RBs) and uses the normal cyclic prefix, $N_{PHICH}^{group}$ becomes {1, 2, 4, 7} according to individual values, and N values depending on $N_{PHICH}^{group}$ {1, 2, 4, 7} becomes {8, 16, 32, 56}.

The above-mentioned description has assumed that one downlink channel (e.g., PDSCH) and one uplink channel (e.g., PUSCH) exist as shown in FIG. 13, this downlink channel and uplink channel are matched with each other, such that the PHICH mapping relationship is established in the direction from the uplink to the downlink.

FIG. 13 is a conceptual diagram illustrating a process for transmitting PUSCH and PHICH through an uplink and a downlink.

Referring to FIG. 13, if it is assumed that a frequency band of an uplink channel (PUSCH) and a frequency band of a downlink channel (PDSCH) are matched with each other, and that PUSCH information is transmitted from each subframe through an uplink, each downlink subframe must always guarantee resources for a PHICH. This PHICH existence in every downlink subframe means that $N_g$ is not defined, where the $N_g$ indicates that $N_{PHICH}^{group}$ shown in Equation 1 is zero '0' (or N=0).

Meanwhile, in some wireless mobile communication system such as an LTE-Advanced (LTE-A), several frequency bands are established, and a base station (BS) and a UE can simultaneously transmit and receive data and information through these frequency bands. Such a wireless mobile communication system needs to establish a PHICH using another method different from that of the above-mentioned scheme.

FIG. 14 exemplarily shows an uplink/downlink (UL/DL) communication concept in a wireless mobile communication system in which a plurality of frequency bands is established.

Five frequency bands 1401, 1402, 1403, 1404 and 1405 exist for the example of the wireless mobile communication system of FIG. 14. The frequency band A (1401), the frequency band B (1402), and the frequency band C (1403) are used for both the uplink and the downlink, and the frequency band D (1404) and the frequency band E (1405) are used only for the downlink. In this case, if it is assumed that the above-mentioned wireless mobile communication system uses a FDD (Frequency Division Duplex), the uplink frequency band is different from the downlink frequency band. However, because the uplink band is mapped one-to-one to the downlink band, the uplink band and the downlink band will hereinafter be described using the same reference numbers. In other words, it should be understood that an actual frequency of the uplink frequency band A (1401) may be different from that of the downlink frequency band A (1401), and this understanding concept may also be likewise applied to other frequency bands B (1402) and C (1403).

In each of the frequency band A (1401), the frequency band B (1402) and the frequency band C (1403) shown in FIG. 14, an uplink and a downlink are mapped one-to-one to each other. In other words, both an uplink channel including a PUSCH and a downlink channel including a PHICH are present in each of the frequency band A (1401), the frequency band B (1402), and the frequency band C (1403). In more detail, a PHICH 1407, which includes Downlink Acknowledgement/Negative-Acknowledgment (DL ACK/NACK) information indicating a reception response to a PUSCH 1406 transmitted via an uplink of the frequency band A (1401), is included in the frequency band A (1401). Likewise, a PHICH 1409 including DL ACK/NACK information indicating a reception response to a PUSCH 1408 transmitted via an uplink of the frequency band B (1402), is included in the frequency band B (1402). PHICH 1411 including DL ACK/NACK information indicating a reception response to a PUSCH 1410 transmitted via an uplink of the frequency band C (1403) is included in the frequency band C (1403).

However, because a PUSCH is not transmitted via an uplink in the frequency band D (1404) and the frequency band E (1405), DL ACK/NACK information for the PUSCH does not exist and thus a PHICH need not be transmitted via a downlink. In other words, the number of PHICHs transmitted through each downlink subframe in each of the frequency band D (1404) and the frequency band E (1405) is zero '0' (N=0). However, according to the conventional signaling method of indicating the number of PHICH groups or the number of PHICHs, $N_g$ indicating $N_{PHICH}^{group}=0$ does not exist and it is impossible to indicate N=0. Therefore, it is impossible to indicate that PHICH is not transmitted. The above-mentioned exemplary situation may be generalized and described as follows.

Firstly, if the number of frequency bands each used as a downlink is equal to or less than the number of frequency bands each used as an uplink, for example, if the number of frequency bands each used as a downlink is 3 and the number of frequency bands each used as a uplink is 5, PHICH transmission for uplink transmission is needed for the overall downlink frequency band.

On the other hand, it can be the case that the number of downlink frequency bands is greater than the number of uplink frequency bands, and no PUSCH is present in some frequency bands. In this case, a PHICH need not be transmitted via a downlink in a frequency band having no PUSCH. However, according to the conventional signaling method of indicating the number of PHICH groups or the number of PHICHs, $N_g$ indicating $N_{PHICH}^{group}=0$ does not exist and it is impossible to indicate N=0. Therefore, it is impossible to indicate that no PHICH is transmitted. Therefore, there is a need to separately transmit signaling information indicating no PHICH transmission in a specific frequency band.

By the above-mentioned necessity, the present invention may transmit signaling information indicating no PHICH transmission in a specific frequency band, and a transmission region for a PHICH is not assigned to a specific frequency band.

In a downlink frequency band not corresponding to the uplink frequency band, i.e., in a frequency band having no uplink channel, only the LTE-A terminal capable of transmitting/receiving information through several bands can be used since the LTE terminal capable of transmitting/receiving information of only one band cannot use the downlink frequency band not corresponding to an uplink frequency band. For example, in FIG. 14, an uplink channel including a PUSCH is not present in the frequency band D (1404) and the frequency band E (1405), such that only the LTE-A terminal is able to use the frequency band D (1404) and the frequency band E (1405) whereas the conventional LTE terminal is unable to use the frequency bands D (1404) and E (1405).

According to the present invention, if a frequency band, in which a PHICH transmission is not necessary, exists in a wireless mobile communication system (e.g., an LTE-A system) in which several frequency bands are established, then the signaling information indicating that the frequency band is "a downlink frequency band not corresponding to an uplink frequency band", i.e., "a frequency band having no uplink channel", is transferred to the UE. If such signaling is transferred via a downlink channel, the UE decides that no PHICH is transmitted in "the downlink frequency band not corresponding to the uplink frequency band". That is, the UE decides $N_{PHICH}^{group}=0$.

In this case, the UE decides $N_{PHICH}^{group}=0$ in "the downlink frequency band not corresponding to the uplink frequency band", regardless of whether to recognize $N_g$ indicating the number of PHICHs using the conventional method. That is, although $N_g$ is given, $N_{PHICH}^{group}$ calculated depending on this $N_g$ value is disregarded and $N_{PHICH}^{group}$ is set to 0 ($N_{PHICH}^{group}=0$). Thereafter, the UE receives information of a PDCCH in consideration of $N_{PHICH}^{group}=0$.

As a more detailed method, by means of detailed system information transmitted through a PDSCH of "a downlink frequency band corresponding to an uplink frequency band" (i.e., "a frequency band including an uplink channel having a PUSCH"), the UE is able to transmit information indicating that a specific downlink frequency band corresponds to a downlink frequency band not mapped to the uplink frequency band. For example, in the case where a PDSCH is received in at least one of the frequency band A (1401), the frequency band B (1402), and the frequency band C (1403) after passing through the steps S1201, S1202, and S1203 of FIG. 12, this received PDSCH may include information indicating that an uplink channel having a PHICH is not present in the frequency band D (1404) and/or the frequency band E (1405).

As described above, because a PDSCH is allocated through a PDCCH, a PDCCH should be recognized to detect the PDSCH, and information indicating the number of PHICHs should be recognized to detect the PDCCH. Therefore, in a wireless mobile communication system in which several frequency bands are established, the number of PHICHs is recognized by the conventional method in a frequency band including an uplink channel having a PHICH, and a PDCCH can be then decoded. In contrast, it is impossible to recognize the number of PHICHs using the conventional method in a frequency band including no uplink channel having the PHICH, and accordingly, the PDCCH cannot be decoded. Therefore, according to the present invention, detailed system information contained in a PDSCH received in a frequency band having an uplink channel having a PHICH further includes signaling information indicating that some specific frequency bands are "downlink frequency bands not corresponding to the uplink frequency bands." The UE establishes $N_{PHICH}^{group}=0$ in the above-mentioned specific frequency bands using the above-mentioned signaling information, and recognizes the position of a PDCCH under the condition of $N_{PHICH}^{group}=0$ For example, although the number of PHICHs can be recognized and then a PDCCH can be decoded by the conventional method in each of the frequency band A (1401), the frequency band B (1402), and the frequency band C (1403) in FIG. 14, it is impossible to recognize the number of PHICHs in the frequency band D (1404) and the frequency band E (1405), and accordingly, the PDCCH cannot be decoded. Therefore, according to the present invention, signaling information indicating that no uplink channel exists in the frequency band D (1404) and the frequency band E (1405) is further included in detailed system information contained in a PDSCH received through at least one of the frequency band A (1401), the frequency band B (1402), and the frequency band C (1403). The UE establishes $N_{PHICH}^{group}=0$ in the frequency bands D (1404) and E (1405) using the above-mentioned signaling information, and recognizes the position of a PDCCH under the condition of $N_{PHICH}^{group}=0$.

FIG. 15 is a flowchart illustrating a method for allowing a UE to receive PDSCH of a frequency band having no uplink channels in a mobile communication system including a plurality of frequency bands according to one embodiment of the present invention.

In FIG. 15, it is assumed that a plurality of frequency bands comprises at least a first frequency band and a second frequency band. UE receives a PBCH of the second frequency band at step S1501. The PBCH of the second frequency band includes not only information indicating the number (N2) of PHICHs contained in one subframe of the second frequency band, but also the information indicating the number (m2) of OFDM symbols mapped to the PHICHs in one subframe of the second frequency band. After that, the UE receives a PDCCH of the second frequency band at step S1502. The PDCCH of the second frequency band is identified by a predetermined scheme based on N2 and m2 values, and includes scheduling information of a PDSCH of the second frequency band. Thereafter, the UE receives a PDSCH of the second frequency band on the basis of the scheduling information of the PDSCH of the second frequency band at step S1503. The PDSCH of the second frequency band includes signaling information indicating that the number of PHICHs present in one subframe of the first frequency band is zero '0'. Thereafter, the UE determines the number (N2) of PHICHs of the first frequency band to be zero '0' at step S1504. Then, the UE receives a PDCCH of the first frequency band at step S1505. The PDCCH of the first frequency band is identified by the above-mentioned information on the basis of specific information indicating that the number of PHICHs present in one subframe of the first frequency band is zero '0', and includes scheduling information related to the PDSCH of the first frequency. Thereafter, the UE receives a PDSCH of the first frequency band on the basis of the scheduling information related to the PDSCH of the first frequency band at step S1506.

It should be understood that the idea of the present invention does not necessarily include all the steps described in the above embodiment. The above-mentioned embodiment can be generalized as shown in the embodiment of FIG. 16.

FIG. 16 is a flowchart illustrating a method for allowing a UE to receive a PDSCH of a frequency band having no uplink channels in a mobile communication system including a plurality of frequency bands according to another embodiment of the present invention.

In FIG. 16, it is assumed that a plurality of frequency bands comprises at least a first frequency band and a second frequency band. The UE receives signaling information through the second frequency band at a first reception step S1610 (a first receiving step). This signaling information indicates that the number (N1) of first downlink channels (PHICHs) allocated to the first frequency band is zero '0'. Then, the UE sets the number (N1) of first downlink channels (PHICHs) allocated to the first frequency band is zero '0' at step S1620. Thereafter, the UE receives a PDCCH of the first frequency band at step S1630. The PDCCH of the first frequency band is identified based on the above information indicating that the number of PHICHs is 0, and includes scheduling information of the PDSCH of the first frequency band. Therefore, the UE is able to receive the PDSCH of the first frequency band as at step S1640. The step S1610 may further include a step S1611 for receiving a PBCH of the second frequency band, a step S1612 for receiving a PDCCH of the second frequency band, and a second reception step S1613 for receiving a second downlink channel (PDSCH) of the second frequency band. In this case, a PBCH of the second frequency band includes not only information indicating the number (N2) of PHICHs present in one subframe of the second frequency band, but also information indicating the number (m2) of OFDM symbols mapped to the PHICHs in one subframe. A PDCCH of the second frequency band is identified based on the number (N2) of PHICHs and the number (m2) of OFDM symbols, and includes scheduling information of the second downlink channel (PDSCH). The second downlink channel (PDSCH) includes the signaling information.

Figure 17:
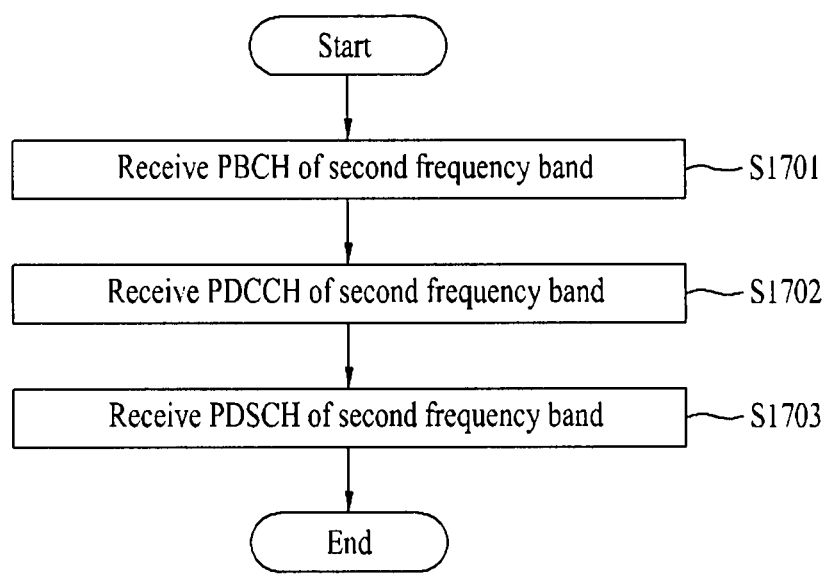
FIG. 17 is a conceptual diagram illustrating a method for allowing a base station (BS) to transmit specific information indicating that the number of PHICHs contained in a frequency band having no uplink channels is zero (0) in a mobile communication system including a plurality of frequency bands.

FIG. 17 is a conceptual diagram illustrating a method for allowing a base station (BS) to transmit specific information indicating that the number of PHICHs contained in a frequency band having no uplink channels is zero (0) in a mobile communication system including a plurality of frequency bands.

In FIG. 17, it is assumed that a plurality of frequency bands comprises at least the first frequency band and the second frequency band. A base station (BS) transmits a PBCH of a second frequency band at step S1701. The BS transmits a PDCCH of the second frequency band at step S1702. The BS transmits a PDSCH of the second frequency band at step S1703. In this case, the transmitted PDSCH information further includes signaling information indicating that the number of PHICHs present in one subframe of the first frequency band is zero '0'.

Figure 18:
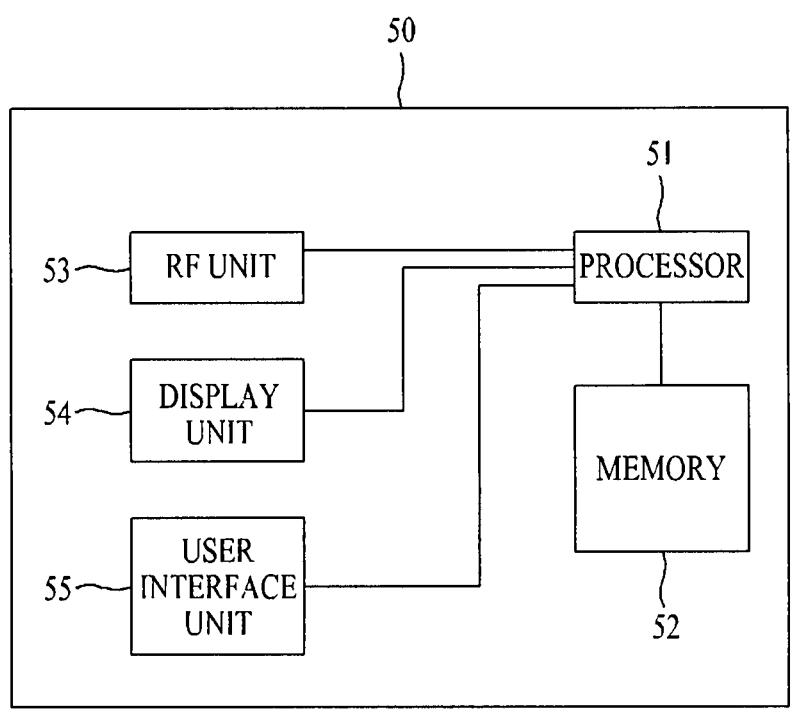
FIG. 18 illustrates constituent elements of a device which can be used for implementing the present invention.

FIG. 18 illustrates constituent elements of a device which can be used for implementing the present invention.

Figure 1:
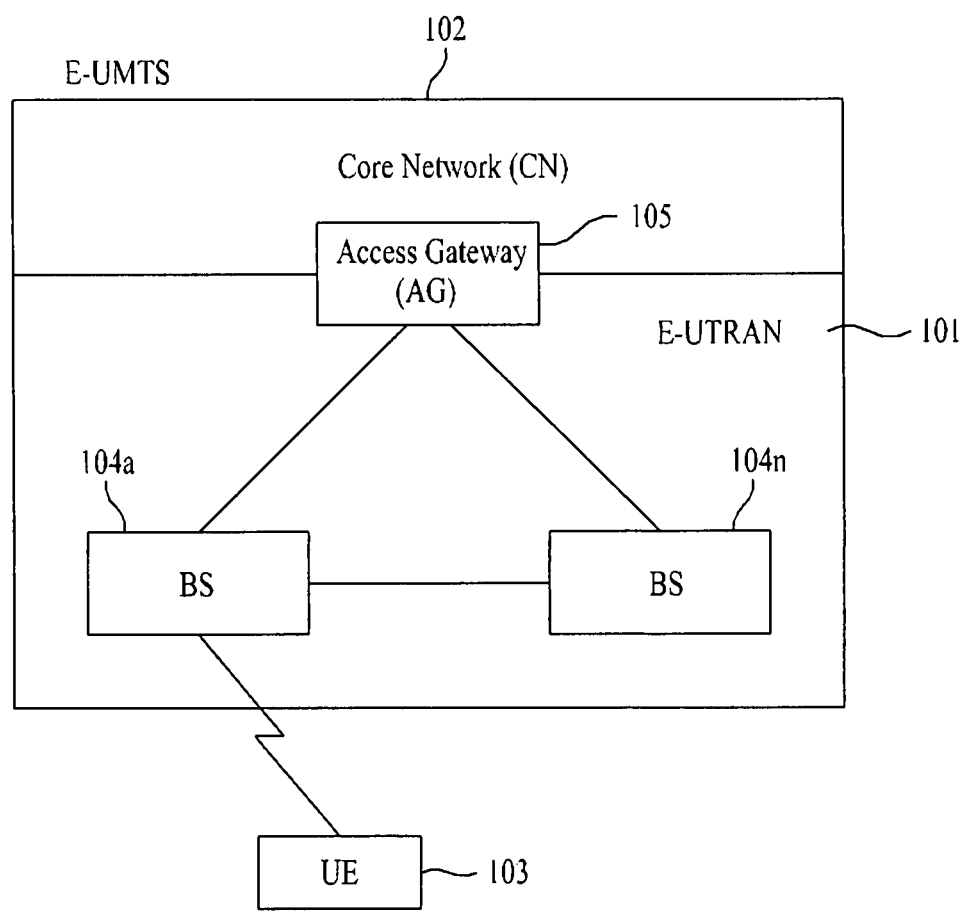
FIG. 1 is a block diagram illustrating an Evolved Universal Mobile Telecommunications System (E-UMTS) network structure as an example of a mobile communication system.
Figure 2:
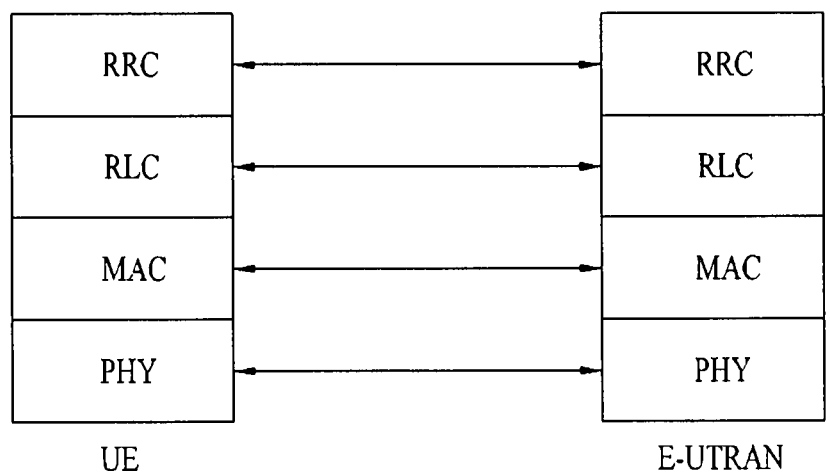
FIG. 2 and FIG. 3 illustrate radio interface protocol structures between a UE and a UMTS Terrestrial Radio Access Network (UTRAN) that are based on a 3GPP radio access network standard.
Figure 3:
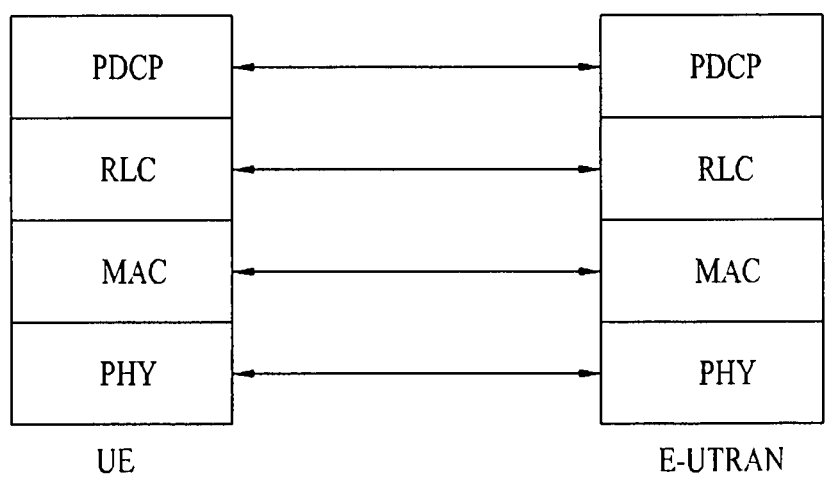

In FIG. 18, the device 50 may be a UE 103 of FIG. 1 or a BS (104a, ..., 104n) of FIG. 1. In addition, the above-mentioned methods shown in FIG. 12 to FIG. 17 can be implemented by this device 50. The device 50 includes a processor 51, a memory 52, a Radio Frequency (RF) unit 53, a display unit 54, and a user interface unit 55. Layers of the radio interface protocol are realized in the processor 51. The processor 51 provides a control plane and a user plane. Functions of individual layers can be implemented in the processor 51. The processor 51 may include a contention resolution timer. The memory 52 is connected to the processor 51 and stores an operating system, applications, and general files. If the device 50 is a UE, the display unit 54 displays various information, and may use well-known elements such as a Liquid Crystal Display (LCD), an Organic Light Emitting Diode (OLED), and the like. The user interface unit 55 may be constructed with a combination of well-known user interfaces such as a keypad, a touch screen, and the like. The RF unit 53 is connected to the processor 51 so that it can transmit and receive RF signals to and from the processor 51.

If the device 50 is a UE, reception of RF signals of each downlink channel at steps S1501, S1502, S1503, S1505, and S1506 shown in FIG. 15 may be carried out by the RF unit 53. A PBCH of the second frequency band, a PDCCH of the second frequency band, a PDSCH of the second frequency band, a PDCCH of the first frequency band, and a PDSCH of the first frequency band can be decoded by the processor 51. In addition, the step S1504 may also be carried out by the processor 51.

If the device 50 is a UE, reception of RF signals of each downlink channel at steps S1610, S1611, S1612, S1613, S1630 and S1640 shown in FIG. 16 may be carried out by the RF unit 53. A PBCH of the second frequency band, a PDCCH of the second frequency band, a PDSCH of the second frequency band, signaling information received through the second frequency band, a PDCCH of the first frequency band, and a PDSCH of the first frequency band can be decoded by the processor 51. In addition, the step S1620 may also be carried out by the processor 51.

If the device 50 is a base station (BS), transmission of RF signals of each downlink channel at steps S1701, S1702, and S1703 shown in FIG. 17 may be carried out by the RF unit 53. In this case, the processor 51 may allow a PDSCH of the second frequency band to further include signaling information indicating that the number of PHICHs present in one subframe of the first frequency band is zero '0'.

Although the present invention has been disclosed by referring to the above-mentioned embodiments, it should be noted that the aforementioned embodiments have been disclosed only for illustrative purposes, and those skilled in the art will appreciate that various modifications, additions and substitutions are possible, without departing from the scope and spirit of the invention as disclosed in the accompanying claims. Thus, it is intended that the present invention covers the modifications and variations of this invention provided they come within the scope of the appended claims and their equivalents. Therefore, the present invention is not limited to only the above-mentioned embodiments, but can be applied to other examples which can satisfy the above principles and new characteristics of the present invention.

INDUSTRIAL APPLICABILITY

As apparent from the above description, although the above-mentioned signal transmission/reception technology and a UE structure for this technology have been disclosed on the basis of application examples for the 3GPP LTE system, the inventive concept of the present invention is applicable not only to the 3GPP LTE system, but also to other mobile communication systems having processes similar to those of the 3GPP LTE system.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for receiving information indicating a number of downlink channels by a user equipment (UE) of a wireless mobile communication system including a first frequency band and a second frequency band, the method comprising:
receiving signaling information indicating that a number (N1) of first downlink channels allocated to the first frequency band is zero (0) through the second frequency band; and
determining that the number (N1) of first downlink channels allocated to the first frequency band is 0; and
receiving a Physical Downlink Control Channel (PDCCH) of the first frequency band;
wherein the PDCCH of the first frequency band is identified by a predetermined equation based on information indicating that the number (N1) of the first downlink channels allocated in the first frequency band is 0,
wherein the first downlink channels are Physical Hybrid-ARQ Indicator Channels (PHICHs).

2. The method according to claim 1, wherein receiving signaling information indicating that a number (N1) of the first downlink channels allocated to the first frequency band is 0 includes receiving a second downlink channel of the second frequency band,
wherein the second downlink channel includes the signaling information indicating that the number (N1) of first downlink channels allocated to the first frequency band is zero (0).

3. The method according to claim 2, wherein the second downlink channel is a Physical Downlink Shared Channel (PDSCH).

4. The method according to claim 3, wherein receiving signaling information indicating that a number (N1) of the first downlink channels allocated to the first frequency band is 0 further includes:
before receiving the PDSCH of the second frequency band, receiving a Physical Broadcast Channel (PBCH) of the second frequency band; and
receiving a Physical Downlink Control Channel (PDCCH) of the second frequency band.

5. The method according to claim 4, wherein the PBCH of the second frequency band includes information indicating a number (N2) of PHICHs present in one subframe of the second frequency band and information indicating a number (m2) of Orthogonal Frequency Division Multiplexing (OFDM) symbols mapped to the PHICHs in one subframe of the second frequency band,
the PDCCH of the second frequency band is identified based on the number (N2) of PHICHs and the number (m2) of OFDM symbols, and
the PDCCH of the second frequency band includes scheduling information of the second downlink channel.

6. The method according to claim 1, further comprising:
after receiving the PDCCH of the first frequency band, receiving a Physical Downlink Shared Channel (PDSCH) of the first frequency band.

7. A user equipment (UE) for a wireless mobile communication system including a first frequency band and a second frequency band, the user equipment (UE) comprising:
a radio frequency (RF) unit; and
a processor electrically connected to the RF unit,
wherein the processor is configured to receive signaling information indicating that the number (N1) of first downlink channels allocated to the first frequency band is zero (0) through the second frequency band after passing through the RF unit, and determine that the number (N1) of first downlink channels allocated to the first frequency band is 0,
wherein the processor receives a Physical Downlink Control Channel (PDCCH) of the first frequency band,
wherein the PDCCH of the first frequency band is identified by a predetermined equation based on information indicating that the number (N1) of the first downlink channels allocated in the first frequency band is 0,
wherein the first downlink channels are Physical Hybrid-ARQ Indicator Channels (PHICHs).

8. The user equipment (UE) according to claim 7, wherein the processor is further configured to receive a second downlink channel of the second frequency band through the RF unit, wherein the second downlink channel includes the signaling information indicating that the number (N1) of first downlink channels allocated to the first frequency band is zero (0).

9. The user equipment (UE) according to claim 8, wherein the second downlink channel is a Physical Downlink Shared Channel (PDSCH).

10. The user equipment (UE) according to claim 9, wherein the processor is configured to receive a Physical Broadcast Channel (PBCH) of the second frequency band, and receive a Physical Downlink Control Channel (PDCCH) of the second frequency band.

11. The user equipment (UE) according to claim 10, wherein the PBCH of the second frequency band includes information indicating a number (N2) of PHICHs present in one subframe of the second frequency band and information indicating a number (m2) of Orthogonal Frequency Division Multiplexing (OFDM) symbols mapped to the PHICHs in one subframe of the second frequency band,
   the PDCCH of the second frequency band is identified based on the number (N2) of PHICHs and the number (m2) of OFDM symbols, and
   the PDCCH of the second frequency band includes scheduling information of the second downlink channel.

12. The user equipment (UE) according to claim 7, wherein the processor is further configured to:
   after receiving the Physical Downlink Shared Channel (PDSCH) of the first frequency band.

13. A method for transmitting information indicating a number of downlink channels by a base station of a wireless mobile communication system including a first frequency band and a second frequency band, the method comprising:
   transmitting a physical broadcast channel of the second frequency band;
   transmitting signaling information indicating that a number (N1) of first downlink channels allocated to the first frequency band is zero (0) through the second frequency band; and
   transmitting a physical downlink control channel (PDCCH) of the first frequency band;
   wherein the PDCCH of the first frequency band is identified by a predetermined equation based on information indicating that the number (N1) of the first downlink channels allocated in the first frequency band is 0,
   wherein the first downlink channels are Physical Hybrid-ARQ Indicator Channels (PHICHs).

14. The method according to claim 13, wherein the signaling information is transmitted through a Physical Downlink Shared Channel (PDSCH) of the second frequency band.

15. A base station (BS) for a wireless mobile communication system including a first frequency band and a second frequency band, the base station (BS) comprising:
   a radio frequency (RF) unit; and
   a processor electrically connected to the RF unit,
   wherein the processor is configured to transmit a physical broadcast channel of the second frequency band, transmit signaling information indicating that a number (N1) of first downlink channels allocated to the first frequency band is zero (0) through the second frequency band, and transmit a Physical Downlink Control Channel (PDCCH) of the first frequency band;
   wherein the PDCCH of the first frequency band is identified by a predetermined equation based on information indicating that the number (N1) of the first downlink channels allocated in the first frequency band is 0,
   wherein the first downlink channels are Physical Hybrid-ARQ Indicator Channels (PHICHs).

16. The base station (BS) according to claim 15, wherein the signaling information is transmitted through a Physical Downlink Shared Channel (PDSCH) of the second frequency band.

* * * * *